United States Patent
Fielder

(10) Patent No.: US 8,080,913 B2
(45) Date of Patent: Dec. 20, 2011

(54) HOLLOW TURBINE

(76) Inventor: William Sheridan Fielder, Ojai, CA (US)

( * ) Notice: Subject to any disclaimer, the term of this patent is extended or adjusted under 35 U.S.C. 154(b) by 0 days.

(21) Appl. No.: 12/925,364

(22) Filed: Oct. 19, 2010

(65) Prior Publication Data

US 2011/0037265 A1    Feb. 17, 2011

Related U.S. Application Data

(62) Division of application No. 11/803,062, filed on May 11, 2007, now Pat. No. 7,843,099.

(51) Int. Cl.
*H02K 9/12* (2006.01)
(52) U.S. Cl. ................................. 310/102 R; 290/54
(58) Field of Classification Search .......... 310/102 R; 290/42–44, 53, 54; 418/3.1, 4.3, 4.5; 415/91, 415/906, 908
See application file for complete search history.

(56) References Cited

U.S. PATENT DOCUMENTS

| | | | | |
|---|---|---|---|---|
| 3,655,294 A | * | 4/1972 | Thatcher | 415/68 |
| 3,719,436 A | | 3/1973 | McFarlin | |
| 4,367,413 A | * | 1/1983 | Nair | 290/52 |
| 4,555,637 A | * | 11/1985 | Irvine | 290/52 |
| 5,252,875 A | * | 10/1993 | Veronesi et al. | 310/114 |
| 6,729,840 B2 | * | 5/2004 | Williams | 415/3.1 |
| 6,763,915 B2 | * | 7/2004 | Nagao et al. | 185/37 |
| 6,957,947 B2 | | 10/2005 | Williams | |
| 7,843,099 B2 | * | 11/2010 | Fielder | 310/102 R |
| 2005/0285407 A1 | | 12/2005 | Davis et al. | |

* cited by examiner

*Primary Examiner* — Dang D Le

(57) ABSTRACT

A turbine which incorporates intake and exhaust pipes that prevent the passing flow from interfering with, or impeding the operation of the turbine. An optional directional cone, with optional helical supports, mounts within the intake pipe and channels flow at an optimal angle to the turbine blades as well as to the outermost, from the axis of rotation, area of the blade's surface, increasing torque and thus efficiency. The turbine's blades are affixed to the inner surface of a cylindrical shell that is free to rotate within a supporting structure. The cylindrical shell also contains the stationary intake and exhaust pipes. The vacant axis of rotation can be closed or open, by means of shorter blades that form a hole with the distal edges of the blades to allow for passing fish and debris to safely exit. Rotational energy is transferred from the outer surface of the cylindrical shell by gears or belts.

23 Claims, 5 Drawing Sheets

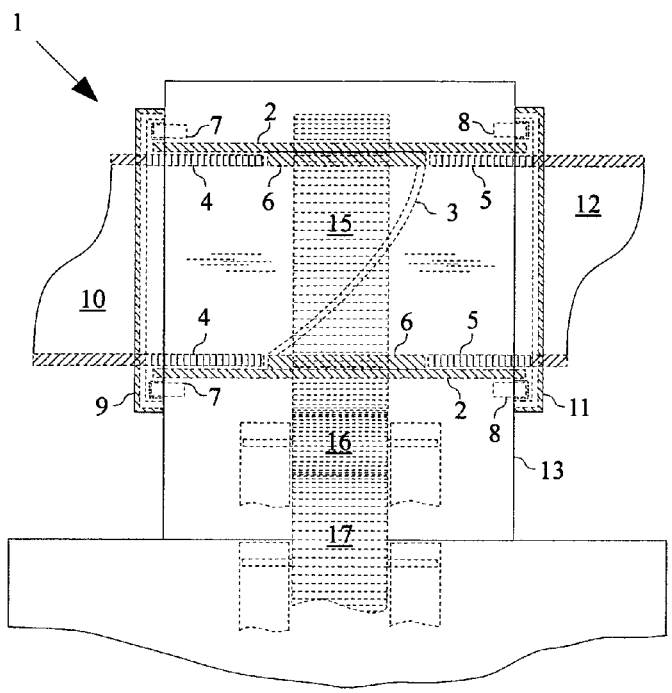
Fig. 1
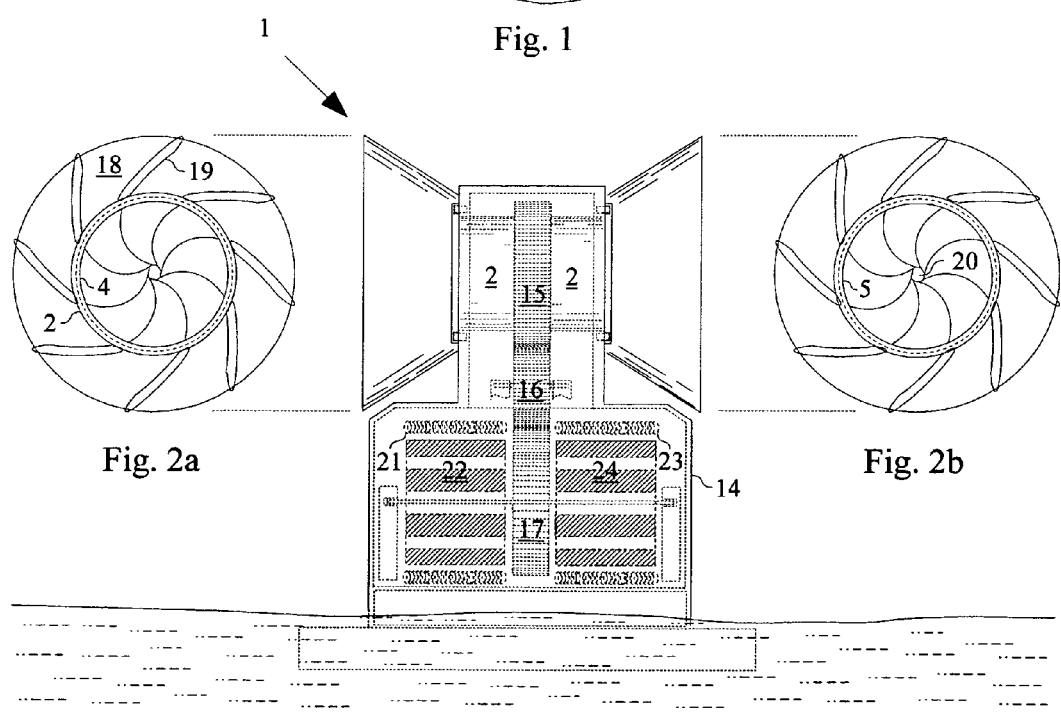
Fig. 2a  Fig. 2b
Fig. 2

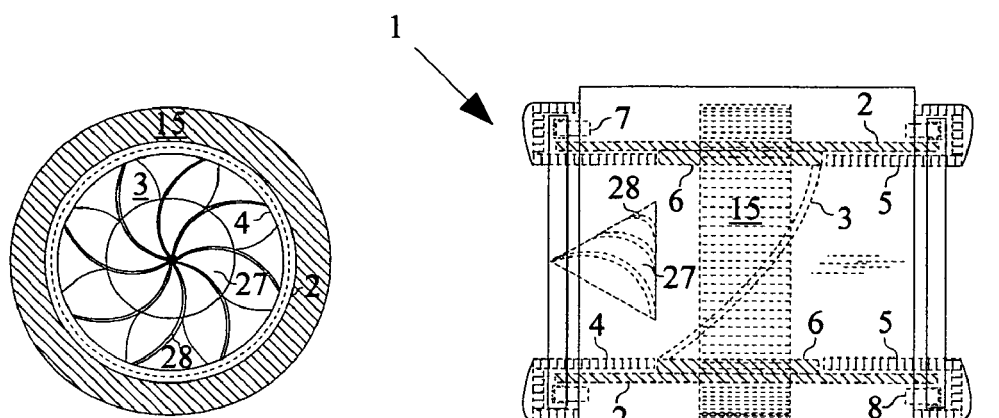
Fig. 5a
Fig. 5
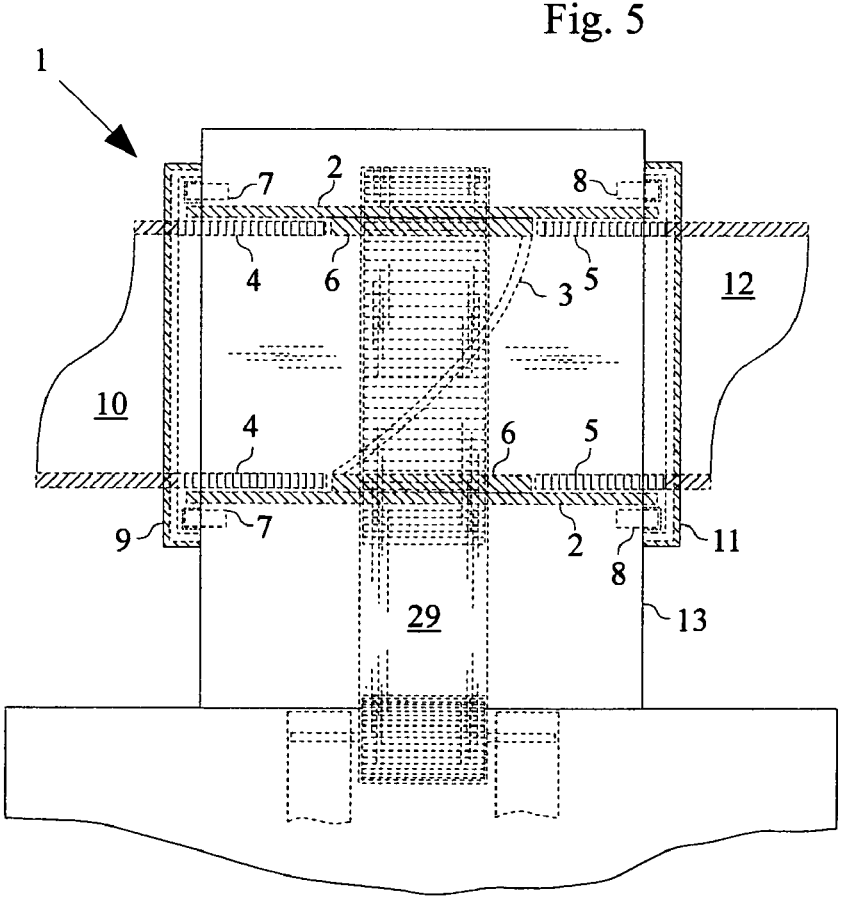
Fig. 6

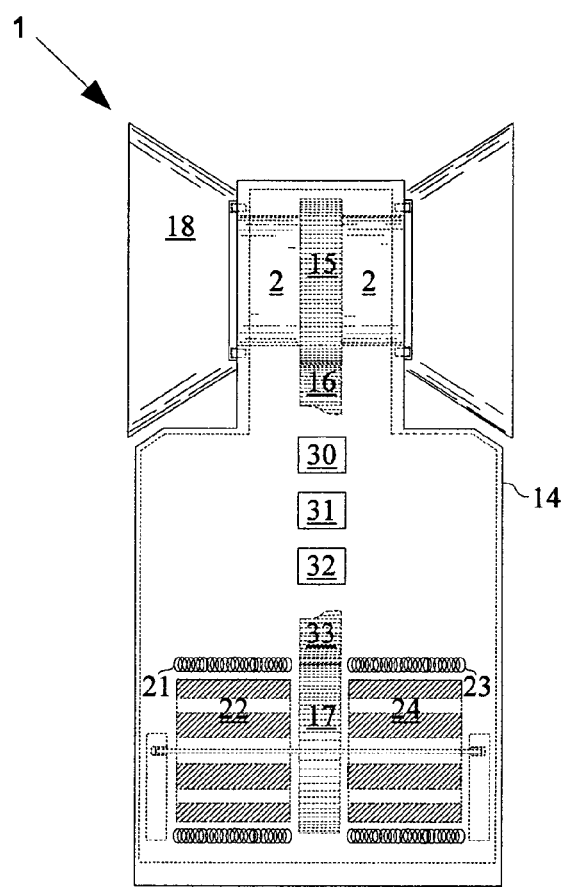
Fig. 7
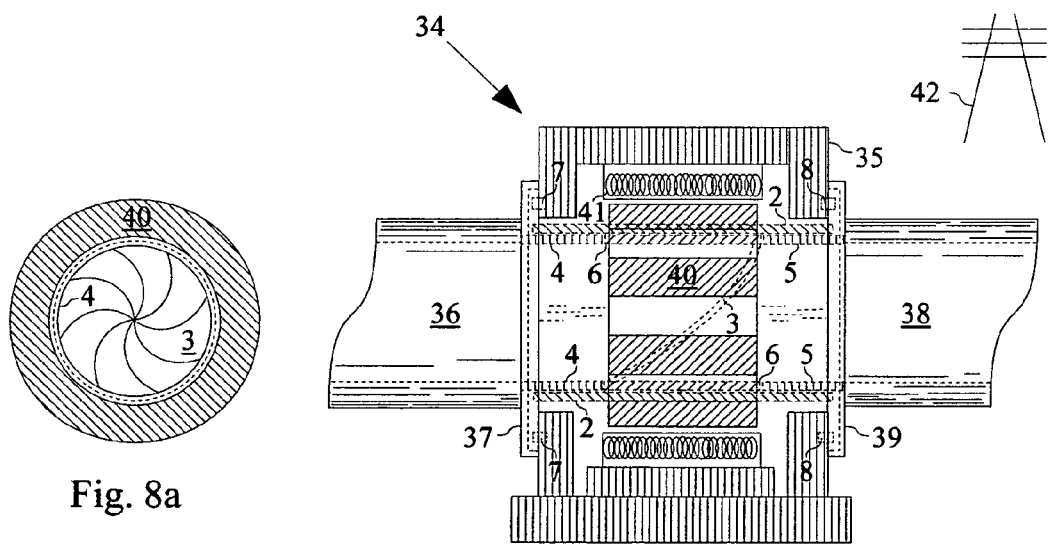
Fig. 8a
Fig. 8

HOLLOW TURBINE

CROSS-REFERENCE TO RELATED APPLICATIONS

This application is a DIV of Ser. No. 11/803,062, now U.S. Pat. No. 7,843,099, filed May 11, 2007 by the present inventor, which is incorporated by reference, which references the turbine and related technologies disclosed in my patent application Ser. No. 10/885,876, filed Jul. 6, 2004, that benefits from Provisional Application Ser. Nos. 60/485,577 filed Jul. 7, 2003; 60/487,372 filed Jul. 15, 2003; 60/489,254 filed Jul. 22, 2003; and 60/494,186 filed Aug. 11, 2003, all by the present inventor, which are all incorporated by reference.

This application also includes the energy storage means described in the patent: Self-Winding Generator, U.S. Pat. No. 7,127,886 B2, by the present inventor, which is incorporated by reference.

FEDERALLY SPONSORED RESEARCH

None.

SEQUENCE LISTING

None.

BACKGROUND OF INVENTION

Prior Art

Some axial flow devices, such as McFarlin (U.S. Pat. No. 3,719,436), allow passing flows to interact/interfere with the exposed rotors of their pumps/turbines in areas other than the blades themselves. I have found that this adds unnecessary weight, drag, and vibration that adversely effect efficiency, and result in less energy captured and higher maintenance costs.

SUMMARY

In accordance with one embodiment, intake and exhaust pipes prevent a passing flow from adding weight, drag, and vibration to an axial flow device.

In accordance with another embodiment, an optional directional cone and its optional helical supports channel incoming flow in an optimal direction to the outermost and efficient portion of the turbine's blades from the axis of rotation.

In accordance with yet another embodiment, at least one optional energy storage spring, as described in U.S. Pat. No. 7,127,886 B2, stores inconstant rotational energy from a turbine, and when it's released, provides continuous rotational energy at a constant rate.

ADVANTAGES

Accordingly, several objects and advantages of one or more aspects are as follows: to capture the kinetic energy of passing liquids and gases, in an environmentally friendly manner, more effectively and efficiently than was previously possible.

Novel features include: intake and exhaust pipes that prevent entering and exiting flow from interfering with the rotating turbine, thus increasing efficiency while decreasing vibration, thereby resulting in longer hardware life cycles. An optional directional cone, with optional helical supports, channels flow at an optimal angle to the rotor's turbine blades as well as to the outermost more efficient area of the blade's surface, increasing torque and thus efficiency.

Rotationally connecting at least one energy storage spring to the turbine effectively transforms kinetic energy into potential energy, and then into rotational energy, in a highly efficient manner. An energy storage spring negates the need for pressure and flow control valves and effectively captures all of the available kinetic energy.

Additional features include: a vacant center axis, since energy is captured at the peripheral surfaces instead of from a central shaft; a debris exhaust hole, whose size is application dependent; a lightweight and durable turbine possibly made from composite materials with an optional titanium veneer; bidirectional support; a means for offshore production of electricity, distilled water, hydrogen, and possibly more, located above or below the water line; a scalable design that adjusts to meet energy requirements; a modular design that allows for upgrades and repair/replacement.

All generators, turbines, and pumps of this type will benefit from the unique features taught in this application.

DRAWINGS—FIGURES

In the drawings, closely related figures have the same number but different suffixes.

FIG. 1 shows a side view of the turbine (HOLLOW TURBINE) and the intake and exhaust pipes that ultimately attach to a pipeline, and is suitable for both high and low head applications.

FIG. 2 shows a submerged turbine that is suitable for tidal or ocean current energy capture, with rotationally attached rotors.

FIGS. 2a and 2b show opposing sides of the submersible turbine's funnels.

FIG. 5 is another side view of the turbine with a directional cone attached to the inside of the intake pipe by supports. This view is depicted within a submersible structure.

FIG. 5a is a front view of the turbine with a directional cone attached within the intake pipe by supports and with a different rotor design.

FIG. 6 shows a side view of the turbine that features a belt type rotational energy connecting element, within a submersible structure.

FIG. 7 shows a side view of the turbine that includes an energy storage spring and two gear box/transmissions, all within a structure.

FIG. 8 shows a side view of a pump (HOLLOW PUMP) that includes intake and exhaust pipes, and connects to an electric power source. Also shown is a connected pipeline.

FIG. 8a shows a front view of the pump's blades and intake pipe with an attached rotor.

Figure 3A:
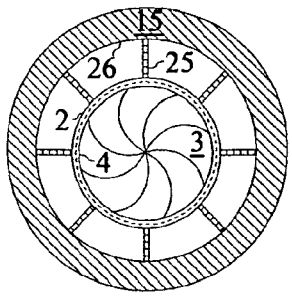
FIGS. 3a and 3b show two different blade arrangements. Also shown is an extended rotor/gear connected by rotor supports in between the inner surface of the rotor and the outer surface of the turbine's cylindrical shell.

DRAWINGS—REFERENCE NUMERALS 1 turbine
2 cylindrical shell
3 blades
4 intake pipe
5 exhaust pipe
6 spacer
7 bearing
8 bearing
9 turbine shroud
10 pipeline
11 turbine shroud
12 pipeline
13 supporting structure
14 submersible supporting structure
15 rotational energy connecting element
16 rotational energy connecting element
17 rotational energy connecting element
18 funnel
19 rib
20 vacant axis of rotation
21 stator
22 rotor
23 stator
24 rotor
25 rotor support
26 inside surface of the rotor
27 directional cone
28 directional cone supports
29 belt type rotational energy connecting element
30 gear box/transmission
31 energy storage spring
32 gear box/transmission
33 rotational energy connecting element
34 pump
35 supporting structure
36 pipeline
37 pump shroud
38 pipeline
39 pump shroud
40 magnets
41 stator
42 electric power source
43 rotational energy source
44 modified blade with an extended base

DETAILED DESCRIPTION

FIG. 1—First Embodiment

Figure 3B:
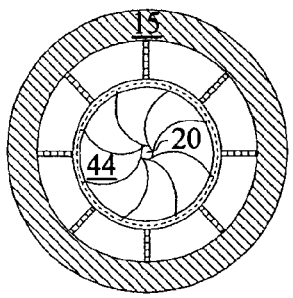

One embodiment of the turbine is illustrated in FIG. 1. It is a cross-sectional view of a turbine (HOLLOW TURBINE) 1 that includes a supporting structure 13 with a connected pipeline 10, 12. One end of the pipeline 10 is fastened to an inlet turbine shroud 9 that is connected to an intake pipe 4 that extends into a cylindrical shell 2 to a location directly adjacent to the turbine's blades 3. The blades 3 are symmetrically/uniformly attached to the inner surface of the cylindrical shell 2. The distal edges of the turbine blades 3 may, depending on their size, appear to form a single point (FIG. 3a) or an empty circle 20 (FIG. 3b). An exhaust pipe 5, attached on one end to an exhaust turbine shroud 11 that also attaches to the other end of the pipeline 12, extends into the opposite side of the cylindrical shell 2 from the intake pipe to a location directly adjacent to the turbine's blades 3. The pipeline 10, 12 is connected to the turbine shrouds 9, 11 by nuts and bolts, welds, or other suitable fasteners, not shown. The cylindrical shell 2 is suspended by bearings 7, 8 that are attached to the supporting structure 13. At least one optional spacer 6 is attached to the inner surface of the cylindrical shell 2, between the intake 4 and exhaust 5 pipes, to elevate the base of the attached turbine blades 3 to the same elevation/height as the inner surfaces of the intake 4 and the exhaust 5 pipes. Thus, the spacer 6 constitutes a means for substantially aligning the base of the turbine's blades 3 with the inner surfaces of said intake 4 and exhaust 5 pipes. Attached to the outer surface of the cylindrical shell 2 is a rotational energy connecting element 15 that is rotationally connected to other rotational energy connecting elements 16, 17. The preceding connections are made with fasteners that include, but are not limited to, bolts and nuts, or welds, and are not shown. Also not shown is a drainage means to remove any flow leaking from between the intake 4 and exhaust 5 pipes and the blades' 3 at least one spacer 6. Such means include, but are not limited to, an array of drainage holes in the cylindrical shell 2 and a gutter, not shown. The cylindrical shell 2 and blades 3 may be fabricated from, but are not limited to, steel, carbon fiber, or other composite materials, and covered with an optional titanium veneer. The intake 4 and exhaust 5 pipes can be fabricated from a variety of suitable materials that include, but are not limited to, steel or another metal, carbon fiber or other composite materials, and may also be covered by a protective veneer.

Operation—FIG. 1

Flow enters the cylindrical shell 2 from the pipeline 10 through the intake pipe 4 until the flow comes into direct contact with the turbine blades 3. The flow then continues out of the cylindrical shell 2 through the exhaust pipe 5 and exits the turbine through the attached pipeline 12. The flow making contact with the turbine blades 3 causes the attached cylindrical shell 2 to rotate. The resulting rotational energy is transferred by means of the rotational energy connecting elements 15, 16, 17. Efficiency is enhanced by preventing the flow from making contact with the spinning cylindrical shell 2, as contact would cause additional weight and drag. Therefore, rotational energy is captured and transferred without interference or vibration from the flow, resulting in an efficient turbine with lower maintenance costs and increased hardware life cycles.

FIGS. 2, 2a, and 2b—Alternative Embodiment

A submersible structure 14 suspends the cylindrical shell 2 (FIG. 2) by means of bearings 7, 8, (FIG. 1). At least one funnel 18, with protruding ribs 19, is attached externally to the submersible structure 14, and is positioned at one end, or opposite ends, of the cylindrical shell 2. Rotors 22, 24 are rotationally connected to the cylindrical shell 2 by rotational energy connecting elements 15, 16, 17. Stators 21, 23 are mounted within the submersible structure 14 in close proximity to the rotors 22, 24. The preceding connections are made with fasteners that include, but are not limited to, bolts and nuts, or welds, and are not shown.

Operation—FIGS. 2, 2a, and 2b

Flow makes contact with the funnel 18, with attached optional ribs 19, and is channeled in an optimal direction to the turbine's blades 3 through the intake pipe 4, as seen in FIG. 1. Two funnels would allow for bidirectional applications. After passing by the blades 3, the flow exits the turbine 1 through the exhaust pipe 5, also depicted in FIG. 1. Rotational energy is transferred by the rotational energy connecting elements 15, 16, 17 and rotates the rotors 22, 24 that produce an alternating magnetic field in close proximity to the stators 21, 23 that generate an alternating current. Therefore, rotational energy is captured and transformed into electricity without interference or vibration from the flow FIGS. 3, 3a, and 3b—Additional Embodiment This embodiment depicts the turbine with an enlarged rotational energy connecting element 15 that is attached to the cylindrical shell 2 by rotor supports 25. The inner diameter of the enlarged rotational energy connecting element 15 is greater than the outer diameter of the cylindrical shell 2. FIGS. 3a and 3b also illustrate two possible blade configurations, one in which the blades 3 form a single point (FIG. 3a), and one in which they form a vacant hole 20 (FIG. 3b). The supporting structure 14 illustrated is of the submersible type.

FIG. 3b also depicts blades 44, fabricated with an extended base, to allow for the thickness of the intake 4 and exhaust 5 pipes, as well as for the clearance between the pipes and the cylindrical shell 2; whereby eliminating the need for any separate spacers. Thus, the extended blades 44 constitute a means for substantially aligning the base of the turbine's blades with the inner surfaces of said intake 4 and exhaust 5 pipes.

Figure 3:
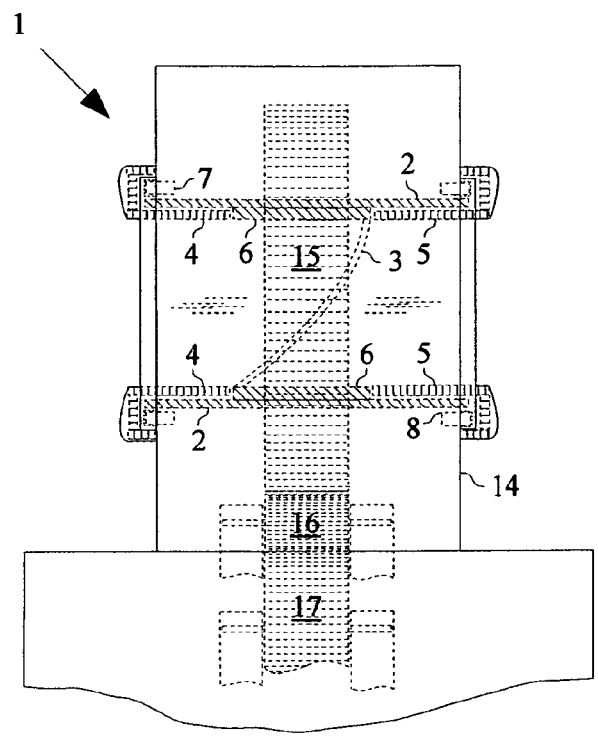
FIG. 3 is another side view of the turbine and the intake and exhaust pipes, within a submerged structure, and without attached pipelines.

Operation—FIGS. 3, 3a, and 3b

Operation is essentially the same as that described for FIG. 2, with the exception that incoming flow isn't directed in an optimal direction by a funnel 18 with ribs 19, and there is no means of generating electricity.

Figure 4A:
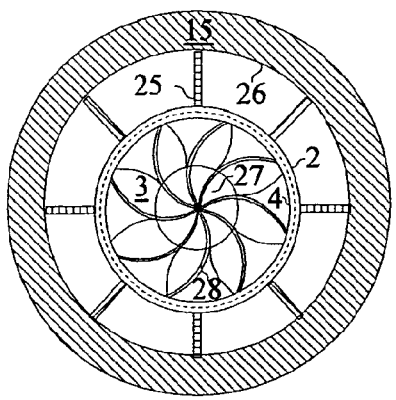
FIG. 4a is a front view of the turbine with a directional cone attached within the intake pipe by supports located in front of the blades. Also shown is an extended rotor/gear connected by rotor supports in between the inner surface of the rotor/gear and the outer surface of the turbine's cylindrical shell.
Figure 4:
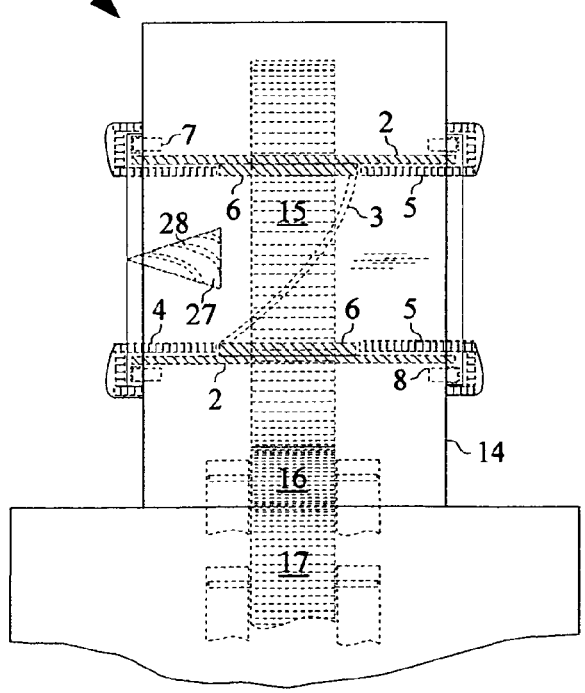
FIG. 4 is a side view of the turbine with a directional cone attached to the inside of the intake pipe by supports. The turbine is depicted within a submersible structure.

FIGS. 4, and 4a—Additional Embodiment

A directional cone 27 is attached by supports 28, that may be helical in shape, within the intake pipe 4 at an optimal position just before the blades 3. The cone 27 may be fabricated from, but is not limited to steel, carbon fiber or other composite materials, and may be covered with an optional titanium veneer. The supporting structure 14 depicted is of the submersible type.

Operation—FIGS. 4, and 4a

Flow enters through the intake pipe 4 and is channeled by the directional cone 27 to the base of the blades 3 and in an optimal direction by the cone's supports 28. The flow then travels out through the exhaust pipe 5. Utilizing the most efficient part of the blades, at their connecting point to the cylindrical shell 2, or spacer 6, yields more torque that results in more rotational energy being generated. Flow that is channeled in an optimal direction to the blades 3 also increases efficiency.

FIGS. 5, and 5a—Additional Embodiment

This embodiment depicts a rotational energy element 15 that is fastened directly to the outer surface of the cylindrical shell 2. It also includes a directional cone 27 and its supports 28.

FIG. 6—Alternative Embodiment

This embodiment illustrates the use of a belt type rotational energy connecting element 29 as a means of transferring rotational energy from the cylindrical shell 2. This embodiment also depicts the non-submersible supporting structure 13 with the attached pipeline 10, 12.

FIG. 7—Alternative Embodiment

An energy storage spring 31 is rotationally connected to the cylindrical shell 2 by a gear box/transmission 30 and rotational energy connecting elements 15, 16. The energy storage spring 31 is also rotationally connected to the rotors 22, 24 by another gear box/transmission 32 and more rotational energy connecting elements 17, 33. Stators 21, 23 are positioned as close to the rotors 22, 24 as possible.

Operation—FIG. 7

Rotational energy, when available, is applied to the the energy storage spring 31 from the gear box/transmission 30. Rotational energy is then released at the desired time, and at the prescribed rate (rotations per minute), by the other gear box/transmission 32. This will provide the rotors 22, 24 with the continuous rotational energy, at a constant rate, that is required to induce electrical current in the stators 21, 23. Utilizing an energy storage spring 31 enables the apparatus to operate in environments where fluctuations in flow are present. Also an energy storage spring negates the need for pressure and flow control valves and effectively captures all of the available kinetic energy.

FIGS. 8, and 8a—Alternative Embodiment

This embodiment depicts a pump (HOLLOW PUMP) 34 that electrically connects at least one stator 41 to an electric power source 42. Magnets 40 are attached to the outer surface of a cylindrical shell 2 by fasteners, not shown. The pump's blades 3 are symmetrically attached to the inner surface of the cylindrical shell 2. An intake pipe 4 extends into the cylindrical shell 2 to a point directly adjacent to the pump's blades 3. The intake pipe 4 is also connected to a pump shroud 37 by nuts and bolts, welds, or other suitable fasteners, not shown. An exhaust pipe 5 extends into the cylindrical shell 2, at the opposite end from the intake pipe, to a spot directly adjacent to the pump's blades 3. The exhaust pipe is connected to another pump shroud 39, also by nuts and bolts, welds, or other suitable fasteners that are not shown. At least one optional spacer 6 is attached to the inner surface of the cylindrical shell 2 to elevate the base of the pump blades 3 to the same elevation as the inner surfaces of the intake 4 and the exhaust 5 pipes. Thus, the spacer 6 constitutes a means for substantially aligning the base of the pump's blades 3 with the inner surfaces of said intake 4 and exhaust 5 pipes. The cylindrical shell 2 is suspended by bearings 7, 8 that attach to a supporting structure 35. Also attached to the supporting structure 35 are the pump shrouds 37, 39 that connect a pipeline 36, 38 to the intake 4 and exhaust 5 pipes. The cylindrical shell 2 and blades 3 may be fabricated from, but are not limited to, steel, composite materials with an optional titanium veneer. The intake 4 and exhaust 5 pipes can be fabricated from a variety of suitable materials that include, but are not limited to, steel or another metal, carbon fiber or other composite materials, and may also be covered by a protective veneer.

Operation—FIGS. 8 and 8a

Electric power from an electric power source 42 creates an alternating magnetic field around the cylindrical shell 2. The shell 2, with attached magnets 40, is rotated as a result of the alternating magnetic field. Flow present in the intake 4 and exhaust pipes 5 is transferred through the pipeline 36, 38 as a result of the spinning cylindrical shell 2 with the attached blades 3. Preventing the flow from making contact with the pump 34 until it reaches the blades 3 results in less interference and vibration, and is therefore more efficient.

FIGS. 9, 9a, 10, and 10a—Additional Embodiments

Figure 9A:
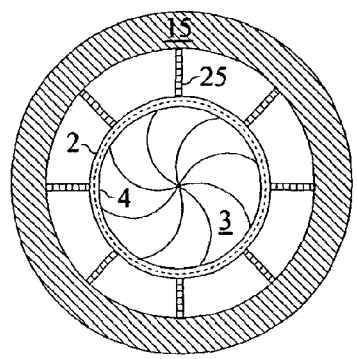
FIG. 9a shows a front view of the pump's blades and intake pipe with a gear type rotational energy connecting element.
Figure 9:
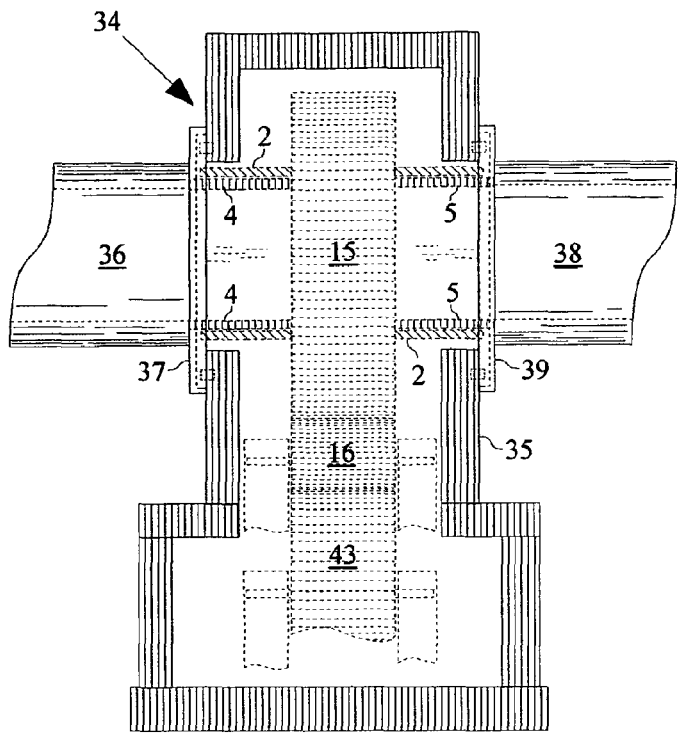
FIG. 9 shows a side view of a pump that features rotational energy connecting elements rotationally attached to a source of rotational energy.
Figure 10A:
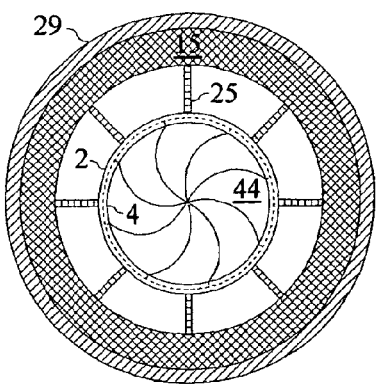
FIG. 10a shows a front view of the pump's blades and intake pipe with an attached belt type energy connecting element.
Figure 10:
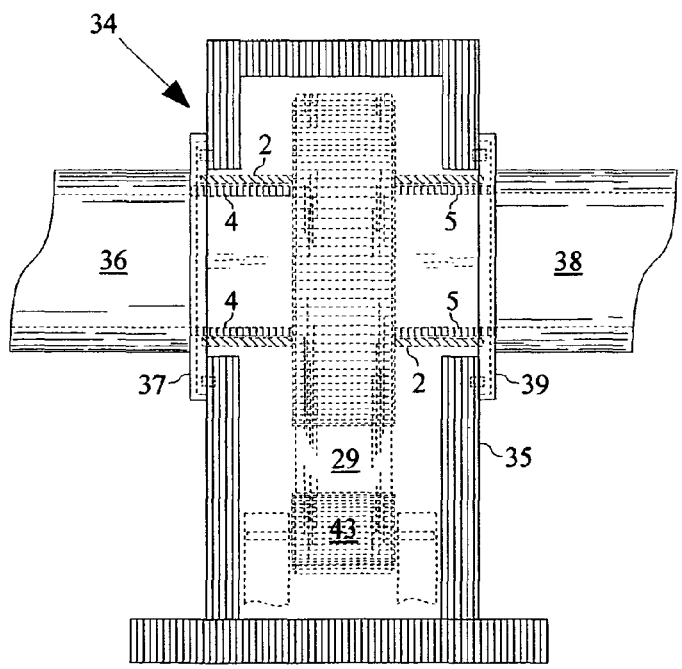
FIG. 10 shows a side view of a pump that features a belt type rotational energy connecting element, rotationally attached to a source of rotational energy.

These embodiments depict pumps 34 that utilize rotational energy connecting elements 15, 16, 29 that are rotationally connected to a rotational energy source 43. FIG. 9 illustrates the use of gears while FIG. 10 utilizes a belt type rotational energy connecting element 29. FIGS. 9a and 10a illustrate the pumps with an enlarged rotational energy connecting element 15 that is attached to the cylindrical shell 2 by rotor supports 25.

FIG. 10a also depicts blades 44, fabricated with an extended base, to allow for the thickness of the intake 4 and exhaust 5 pipes, as well as for the clearance between the pipes and the cylindrical shell 2, whereby eliminating the need for any separate spacers. Thus, the extended blades 44 constitute a means for substantially aligning the base of the pump's blades with the inner surfaces of said intake 4 and exhaust 5 pipes.

Operation—9, 9a, 10, and 10a

Gear type rotational energy connecting elements 15, 16 (FIGS. 9 and 9a), or a belt type 29 (FIGS. 10 and 10a), transfer rotational energy from the rotational energy source 43 to the cylindrical shell 2, with attached blades 3, that transfers flows through the attached pipelines 36, 38. The enlarged rotor produces more torque and increases efficiency.

Advantages

From the description above, a number of advantages of some embodiments become evident:
(a) Preventing the flow from making contact with the spinning cylindrical shell increases efficiency by eliminating the weight and resulting drag introduced if the flow makes contact with the cylindrical shell.
(b) Preventing the flow from making contact with the spinning cylindrical shell also reduces vibration, resulting in longer hardware life cycles.
(c) Directing flow, by means of a cone, to the outermost portion of the turbine's blades, from the axis of rotation, further enhances efficiency by increasing torque.
(d) Helical cone supports channel flow in an optimal direction to the blades.
(e) A vacant axis of rotation allows fish and debris to safely exit the turbine/pump without damaging the apparatus or injuring any fish that may be present.
(f) Eliminating the shaft, or hub, from the axis of rotation permits a larger surface area for the blades, thus enabling the blades to fully leverage the flow.
(g) Bidirectional flow support is also possible.
(h) Incorporating an energy storage spring negates the need for pressure or flow control valves and effectively captures all of the available kinetic energy.

CONCLUSIONS, RAMIFICATIONS, AND SCOPE

Accordingly, the reader will see that the intake and exhaust pipes of the various embodiments can be used to increase efficiency and reduce vibration in axial flow devices. In addition, only an intake or only an exhaust pipe may be necessary to achieve the desired results. Also, the exhaust pipe may be tapered in a downward direction toward the turbine shroud in order to enhance flow in that direction. Furthermore, an embodiment may have additional advantages in that:
it may provide bidirectional support;
it may utilize indestructible welds;
it may incorporate water lubricated low friction bearing means, such as thrust bearings;
it may also incorporate magnetic bearings;
it may have blades that are curved for maximum energy capture;
it may have blades that include a means of adjusting the blades' pitch;
it may provide for blade adjustment as a means of controlling flow;
it may utilize turbine blades that are wider and thicker at their base;
it may incorporate turbine shrouds that extend into the cylindrical shell and replace the intake and exhaust pipes, whereby forming one piece turbine shrouds and intake/exhaust pipes;
it may include guide vanes attached to, or fabricated with the inside surface of the intake pipe to channel flow in an optimal direction to the turbine's blades;
it may be fabricated from plastic;
it may utilize marine grade concrete;
it may be mounted vertically;
it may incorporate a tapered roller bearing;
it is suitable for ocean energy capture as well as high and low head applications;
it may include a grate to prevent fish and debris from entering the device;
it may also include at least one buoyancy means, as described in the patent Buoyant Rotor (U.S. Pat. No. 7,348,686 B2);
it may also include at least one buoyancy means that is integrated with the body of the cylindrical shell;
it may incorporate counter-rotating rotors;
it may be used for providing rotational energy to machinery that relies on rotational energy as a power source;
it may incorporate steam turbine type blades;
it may also be used as a steam turbine;
it may be used for water pipeline diversion applications;
it may be utilized as a means of capturing the kinetic energy found in pressurized water systems, such as irrigation systems;
it may also be utilized as a means of propelling boats and ships through the water;
it may also be used in braking systems as a means of generating electricity;
the electric motor types associated with the pump may include, but are not limited to: AC Induction motors including Shaded Pole and split-phase capacitor types, Universal motors, AC Synchronous motors, Stepper DC motors, Brushless DC motors, Brushed DC motors, Pancake DC motors, and Servo motors;
drive types associated with the pump include, but are not limited to, Uni/Poly-phase AC, Direct AC, DC, Direct DC, and PWM; the variety of motor and drive types demonstrate the wide variety of applications, of varying sizes, that are possible.

I claim:
1. A turbine comprising:
a cylindrical shell having an inner and an outer surface, and a hole at each of the opposing ends of said cylindrical shell;
at least one array of blades attached to said inner surface of said cylindrical shell;
an intake pipe whose outer diameter is less than the inner diameter of said cylindrical shell, wherein said intake pipe is mounted inside said cylindrical shell and prevents the incoming flow from making contact with said turbine until said flow comes into direct contact with said at least one array of blades;
an exhaust pipe whose outer diameter is less than the inner diameter of said cylindrical shell, wherein said exhaust pipe is mounted inside said cylindrical shell, adjacent to, and on the opposite side of said blades from said intake pipe, and prevents the exiting flow from making contact with said cylindrical shell;

at least one means for significantly aligning the base of said blades with the inner surfaces of said intake and said exhaust pipes;

a supporting structure;

at least one means to allow said cylindrical shell to rotate freely in said supporting structure;

at least one rotational energy connecting element;

whereby preventing flow from adding weight, drag, and vibration to said cylindrical shell;

whereby providing a means of efficiently supplying rotational energy.

2. The turbine as claimed in claim 1 wherein said means for significantly aligning the base of said blades is at least one spacer sandwiched in between said inner surface of said cylindrical shell and the base of said array of blades.

3. The turbine as claimed in claim 1 wherein said means for significantly aligning the base of said blades is to extend said base of said blades to compensate for the thickness of said intake and said exhaust pipes, including the clearance between the pipes and the cylindrical shell; whereby forming an integrated spacer; whereby eliminating the need for any separate spacers.

4. The turbine as claimed in claim 1 wherein said intake pipe further includes a cone attached to the inside surface of said intake pipe by at least one support before said blades, wherein said cone directs said incoming flow to the outermost, from the axis of rotation, efficient part of said blades; whereby providing greater torque that results in more rotational energy being generated.

5. The turbine as claimed in claim 4 wherein said at least one support is helical in shape, wherein said incoming flow is channeled in an optimal direction to said blades; whereby efficiency is enhanced.

6. The turbine as claimed in claim 1 wherein said at least one array of blades is absent any shaft or hub attached to the distal edges of said blades;

wherein providing a vacant axis of rotation;

whereby allowing for larger blades that capture more kinetic energy;

whereby providing away for fish and debris to safely exit the turbine.

7. The turbine as claimed in claim 1 wherein said turbine further includes at least one rotationally connected energy storage spring;

whereby providing a means of supplying continuous rotational energy at a constant rate;

whereby negating the need for pressure and/or flow control valves that restrict said flow;

whereby effectively capturing all of the available kinetic energy.

8. The turbine as claimed in claim 1 wherein said supporting structure is submersible.

9. The turbine as claimed in claim 1 wherein said means to allow said cylindrical shell to rotate freely is at least one bearing.

10. The turbine as claimed in claim 1 wherein said at least one rotational energy connecting element is a gear; whereby allowing rotational energy to be transferred to other apparatus.

11. The turbine as claimed in claim 1 wherein said turbine further includes at least one rotationally connected gear/box transmission.

12. The turbine as claimed in claim 1 wherein said at least one rotational energy connecting element is a belt type rotational energy connecting element; whereby allowing rotational energy to be transferred to other apparatus.

13. The turbine as claimed in claim 1 wherein said turbine further includes a funnel;

whereby increasing the efficiency of said turbine.

14. The turbine as claimed in claim 1 wherein said funnel further includes at least one protruding rib that channels said incoming flow in an optimal direction toward said turbine blades; whereby increasing the efficiency of said turbine.

15. A method of transforming kinetic energy into rotational energy comprising:

providing a cylindrical shell having an inner and an outer surface, and a hole at each of the opposing ends of said cylindrical shell;

providing at least one array of blades attached to said inner surface of said cylindrical shell;

providing an intake pipe whose outer diameter is less than the inner diameter of said cylindrical shell, wherein said intake pipe is mounted inside said cylindrical shell and prevents the incoming flow from making contact with the turbine until said flow comes into direct contact with said at least one array of blades;

providing an exhaust pipe whose outer diameter is less than the inner diameter of said cylindrical shell, wherein said exhaust pipe is mounted inside said cylindrical shell, adjacent to, and on the opposite side of said blades from said intake pipe, and prevents the exiting flow from making contact with said cylindrical shell;

providing at least one means for significantly aligning the base of said blades with the inner surfaces of said intake and said exhaust pipes;

providing a supporting structure;

providing at least one means to allow said cylindrical shell to rotate freely in said supporting structure;

providing at least one rotational energy connecting element;

whereby preventing flow from adding weight, drag, and vibration to said cylindrical shell;

whereby providing a means of efficiently supplying rotational energy.

16. The method for transforming kinetic energy as claimed in claim 15 wherein said means for significantly aligning the base of said blades is at least one spacer sandwiched in between said inner surface of said cylindrical shell and the base of said array of blades.

17. The method for transforming kinetic energy as claimed in claim 15 wherein said means for significantly aligning the base of said blades is to extend said base of said blades to compensate for the thickness of said intake and said exhaust pipes, including the clearance between the pipes and the cylindrical shell; whereby forming an integrated spacer; whereby eliminating the need for any separate spacers.

18. A pump comprising:

a cylindrical shell having an inner and an outer surface, and a hole at each of the opposing ends of said cylindrical shell;

at least one array of blades attached to said inner surface of said cylindrical shell;

an intake pipe whose outer diameter is less than the inner diameter of said cylindrical shell, wherein said intake pipe is mounted inside said cylindrical shell and prevents the incoming flow from making contact with said pump until said flow comes into direct contact with said at least one array of blades;

an exhaust pipe whose outer diameter is less than the inner diameter of said cylindrical shell, wherein said exhaust pipe is mounted inside said cylindrical shell, adjacent to, and on the opposite side of said blades from said intake pipe, and prevents the exiting flow from making contact with said cylindrical shell;

at least one means for significantly aligning the base of said blades with the inner surfaces of said intake and said exhaust pipes;

a supporting structure;

at least one means to allow said cylindrical shell to rotate freely in said supporting structure;

at least one means of rotating said cylindrical shell;

whereby preventing flow from adding weight, drag, and vibration to said cylindrical shell;

whereby providing an efficient pump.

19. The pump as claimed in claim 18 wherein said means for significantly aligning the base of said blades is at least one spacer sandwiched in between said inner surface of said cylindrical shell and the base of said array of blades.

20. The pump as claimed in claim 18 wherein said means for significantly aligning the base of said blades is to extend said base of said blades to compensate for the thickness of said intake and said exhaust pipes, including the clearance between the pipes and the cylindrical shell; whereby forming an integrated spacer; whereby eliminating the need for any separate spacers.

21. The pump as claimed in claim 18 wherein said at least one means of rotating said cylindrical shell is at least one electric motor comprising: at least one rotor, including said cylindrical shell, and at least one stator, electrically connected to an electric power source; whereby providing an efficient electric pump.

22. The pump as claimed in claim 18 wherein said at least one means of rotating said cylindrical shell is at least one gear type rotational energy connecting element rotationally connected to a rotational energy source; whereby providing an efficient pump.

23. The pump as claimed in claim 18 wherein said at least one means of rotating said cylindrical shell is a belt type rotational energy connecting element that is rotationally connected to a rotational energy source; whereby providing an efficient pump.

* * * * *